US008200422B2

(12) United States Patent
Shibasaki (10) Patent No.: US 8,200,422 B2
(45) Date of Patent: Jun. 12, 2012

(54) INFORMATION PRESENTATION APPARATUS, INFORMATION PRESENTATION METHOD, INFORMATION PRESENTATION PROGRAM, AND COMPUTER-READABLE RECORDING MEDIUM

(75) Inventor: Hiroaki Shibasaki, Tokyo (JP)

(73) Assignee: Pioneer Corporation, Tokyo (JP)

( * ) Notice: Subject to any disclaimer, the term of this patent is extended or adjusted under 35 U.S.C. 154(b) by 730 days.

(21) Appl. No.: 12/300,690

(22) PCT Filed: May 8, 2007

(86) PCT No.: PCT/JP2007/059503
§ 371 (c)(1),
(2), (4) Date: Nov. 13, 2008

(87) PCT Pub. No.: WO2007/135855
PCT Pub. Date: Nov. 29, 2007

(65) Prior Publication Data
US 2009/0125233 A1     May 14, 2009

(30) Foreign Application Priority Data

May 18, 2006   (JP) .................................. 2006-138501

(51) Int. Cl.
*G01C 21/30*   (2006.01)
(52) U.S. Cl. ...................................................... 701/408
(58) Field of Classification Search ........................ None
See application file for complete search history.

(56) References Cited

U.S. PATENT DOCUMENTS

| 6,026,346 | A | 2/2000 | Ohashi et al. | |
| 2005/0093719 | A1* | 5/2005 | Okamoto et al. | 340/995.1 |
| 2006/0031005 | A1* | 2/2006 | Sakano et al. | 701/200 |
| 2007/0081090 | A1* | 4/2007 | Singh | 348/333.11 |

FOREIGN PATENT DOCUMENTS

| EP | 1 378 724 | 1/2004 |
| JP | 6-309595 | 11/1994 |
| JP | 2002-367100 | 12/2002 |
| JP | 2003-240560 | 8/2003 |
| JP | 2004-37153 | 2/2004 |
| JP | 2006-3787 | 1/2006 |
| JP | 2006-90790 | 4/2006 |

OTHER PUBLICATIONS

Extended European Search Report issued on Nov. 30, 2011 by the European Patent Office in European Patent Application No. 07742938.9, 7 pages.

* cited by examiner

*Primary Examiner* — Paul Danneman
(74) *Attorney, Agent, or Firm* — Young & Thompson (57) ABSTRACT

A detecting unit of an information presentation apparatus detects information concerning driver gaze directed toward a screen displaying map information indicating a current position of a mobile object. A determining unit determines information concerning specific items to be given to a driver from among predetermined information items. An obtaining unit obtains the information determined by the determining unit based on the map information. A generating unit generates guidance information that provides, by sound, the information obtained at the obtaining unit. An output unit outputs the guidance information generated by the generating unit.

20 Claims, 8 Drawing Sheets

| TRAFFIC INFORMATION | REFERENCE UNIT FOR ELAPSED TIME |
|---|---|
| TRAVELING TIME | 10 min |
| DISTANCE TO DESTINATION | 20 min |
| DISTANCE TO LEFT/RIGHT TURN POINT | 1 min |

FIG.6

| TIME DRIVER FIXATED ON DISPLAY | TRAFFIC INFORMATION | | |
|---|---|---|---|
| | TRAVELING TIME | DISTANCE TO DESTINATION | DISTANCE TO LEFT/RIGHT TURN POINT |
| 10:15 | ○ | ○ | ○ |
| 10:15 | × | × | ○ |
| 10:15 | ○ | × | ○ |

(○: PROVIDED, ×: NOT PROVIDED)

| TRAFFIC INFORMATION | REFERENCE UNIT FOR NUMBER OF FIXATIONS |
|---|---|
| TRAVELING TIME | 5 TIMES |
| DISTANCE TO DESTINATION | 3 TIMES |
| DISTANCE TO LEFT/RIGHT TURN POINT | 1 TIME |

FIG.10

| TRAFFIC INFORMATION | REFERENCE UNITS |
|---|---|
| TRAVELING TIME | 10 min |
| DISTANCE TO DESTINATION | 5 km |
| DISTANCE TO LEFT/RIGHT TURN POINT | 100 m |

INFORMATION PRESENTATION APPARATUS, INFORMATION PRESENTATION METHOD, INFORMATION PRESENTATION PROGRAM, AND COMPUTER-READABLE RECORDING MEDIUM

TECHNICAL FIELD

The present invention pertains to an information presentation apparatus, information presentation method, information presentation program, and computer-readable recording medium that provide information. However, application of the present invention is not limited to the information presentation apparatus, the information presentation method, the information presentation program and the computer-readable recording medium.

BACKGROUND ART

A conventional navigation apparatus retrieves an optimal route from a current position to a destination in a short time using pre-stored information concerning places and efficiently assists driving (see Patent Document 1).

Patent Document 1: Japanese Patent Application Laid-Open Publication No. 06-309595

DISCLOSURE OF INVENTION

Problem to be Solved by the Invention

However, one problem of the conventional technique is that a driver cannot grasp information presented on a screen of the navigation apparatus at a glance and yet the driver cannot look at the screen for an extended period while driving.

Means for Solving Problem

To solve the problem above and achieve an object an information presentation apparatus according to the invention of claim 1 includes a detecting unit that detects gaze information concerning driver gaze directed toward a screen that displays assistance information assisting travel of a mobile object; an obtaining unit that, when the gaze information is detected by the detecting unit, obtains information to be given to a driver based on the assistance information; a generating unit that generates guidance information providing, by sound, the information obtained by the obtaining unit; and an output unit that outputs the guidance information generated by the generating unit.

An information presentation method according to the invention of claim 16 includes a detecting step of detecting gaze information concerning driver gaze directed toward a screen that displays assistance information assisting travel of a mobile object; an obtaining step of obtaining, when the gaze information is detected at the detecting step, information to be given to a driver based on the assistance information; a generating step of generating guidance information providing, by sound, the information obtained at the obtaining step; and an output unit that outputs the guidance information generated at the generating step.

An information presentation program according to the invention of claim 17 causes a computer to execute the information presentation method according to claim 16.

A computer-readable recording medium according to the invention of claim 18 stores therein the information presentation program according to claim 17.

EXPLANATIONS OF LETTERS OR NUMERALS

100 INFORMATION PRESENTATION APPARATUS
101 DETECTING UNIT
102 JUDGING UNIT
103 COMPUTING UNIT
104 DETERMINING UNIT
105 OBTAINING UNIT
106 GENERATING UNIT
107 OUTPUT UNIT

BEST MODE(S) FOR CARRYING OUT THE INVENTION

Hereinafter, with reference to the drawings, exemplary embodiments for an information presentation apparatus, an information presentation method, an information presentation program, and a computer-readable recording medium are explained in detail.

(Embodiment)
(Functional Configuration of Information Presentation Apparatus)

Figure 1:
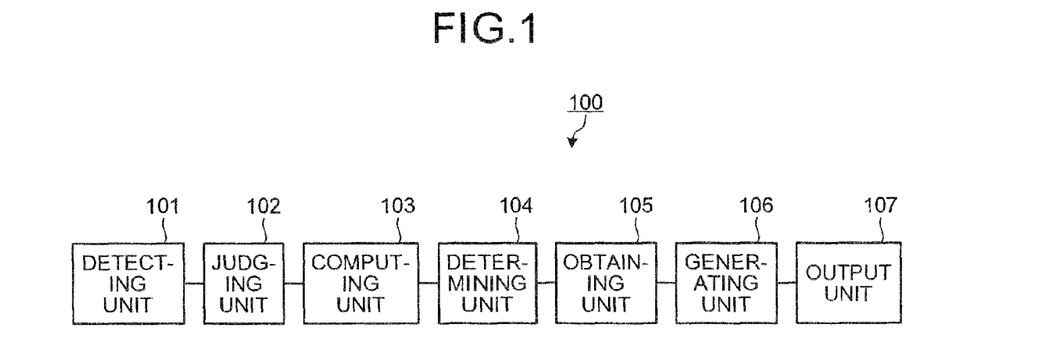
FIG. 1 is a block diagram of one example of a functional configuration of an information presentation apparatus according to an embodiment.

With reference to FIG. 1, a functional configuration of an information presentation apparatus according to the present invention is explained. FIG. 1 is a block diagram of one example of a functional configuration of an information presentation apparatus according to the present embodiment.

As depicted in FIG. 1, an information presentation apparatus 100 includes a detecting unit 101, a judging unit 102, a computing unit 103, a determining unit 104, an obtaining unit 105, a generating unit 106, and an output unit 107.

The detecting unit 101 detects information concerning eye gaze of a driver toward a screen that displays information assisting travel of a mobile object (hereinafter, travel assistance information). Travel assistance information is, for example, map information indicating the current position of the mobile object. Information concerning driver eye gaze is, for example, detected by a camera disposed near the screen of the information presentation apparatus 100.

The judging unit 102 judges whether the driver has visually fixated on the screen of the information presentation apparatus 100, based on the time or frequency of detection by the detecting unit 101 of the information concerning driver eye gaze. For example, if the detecting unit 101 continues to detect the information concerning driver eye gaze for more than a given period of time, or if the detecting unit 101 detects the information concerning driver eye gaze more than a given number of times, the judging unit 102 judges that the driver has fixated on the screen.

The computing unit 103 computes an elapsed time measured from a judgment by the judging unit 102 that the driver has fixated on the screen or from the output of guidance information by the output unit 107 until a judgment by the judging unit 102 that the driver has fixated on the screen again. Or, the computing unit 103 computes the number of fixations over a period from the output of guidance information by the output unit 107 to a judgment by the judging unit 102 that the driver has fixated on the screen. Or, the computing unit 103 computes a traveling time and a traveling distance of the mobile object after judgment by the judging unit 102 that the driver has fixated on the screen or after the output of guidance information by the output unit 107. Or, the computing unit 103 computes the number of times, within a given time period, the judging unit 102 judges that the driver has fixated on the screen. Or, the computing unit 103 respectively computes for predetermined items, an elapsed time period measured from the output of guidance information by the output unit 107 until judgment by the judging unit 102 that the driver has fixated on the screen. Or, the computing unit 103 respectively computes for predetermined items, the number of times the judging unit 102 judges that the driver has fixated on the screen after guidance information is output by the output unit 107. Or, the computing unit 103 computes, for each of the predetermined items, the time and the distance traveled by the mobile object after guidance information is output by the output unit 107.

The determining unit 104, if the judging unit 102 judges that the driver has fixated on the screen, determines information concerning specific items to be provided to the driver from information concerning predetermined items. Here, the determining unit 104 determines the information concerning items to be provided to the driver, based on the current position of the mobile object at the time of detection by the detecting unit 101 of the information concerning driver eye gaze, or based on the information from the computing unit 103. The information concerning predetermined items includes, for example, information concerning a distance or a required time from the current position to a destination, a distance from the current position to a junction, or characteristics of roads, terrain or buildings.

The obtaining unit 105 obtains the information determined by the determining unit 104 as guidance information for a driver, based on the map information. The generating unit 106 generates guidance information that, by sound, informs the driver of the information obtained by the obtaining unit 103. The output unit 105 outputs the guidance information generated by the generating unit and is, for example, a speaker mounted on the mobile object.

(Process of the Information Presentation Apparatus 100)

Figure 2:
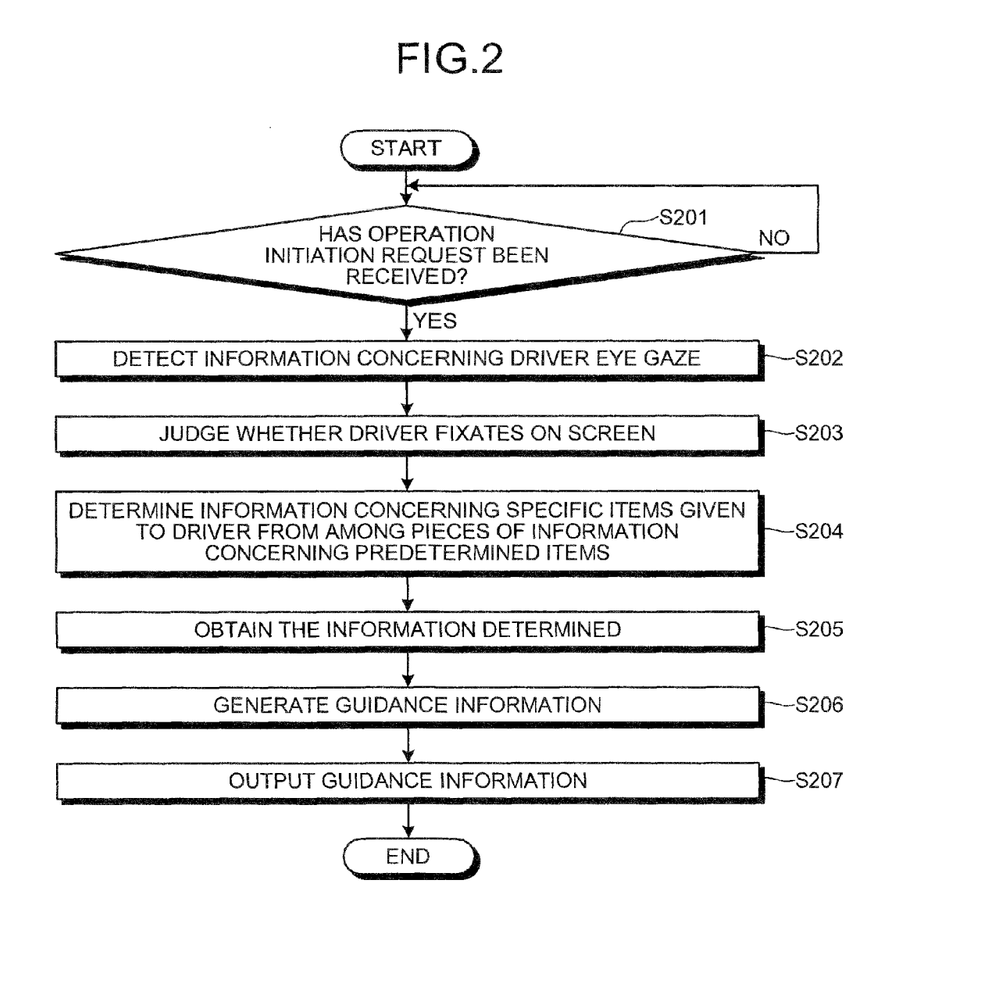
FIG. 2 is a flowchart of a process of the information presentation apparatus according to the embodiment.

With reference to FIG. 2, a process of the information presentation apparatus 100 according to the present embodiment is explained. FIG. 2 is a flowchart of a process of the information presentation apparatus according to the embodiment. As depicted in the flowchart of FIG. 2, the information presentation apparatus 100 determines whether an operation initiation request has been received (step S201). The operation initiation request is given, for example, when a user operates an operating unit (not depicted) and inputs instructions.

At step S201, the process awaits receipt of the operation initiation request (step S201: NO), and when the operation initiation request is received (step S201: YES), the detecting unit 101 obtains information concerning driver eye gaze toward the screen displaying the travel assistance information (step S202). The travel assistance information is, for example, map information indicating the current position of the mobile object. The information concerning driver eye gaze is, for example, detected by a camera disposed near the screen of the information presentation apparatus 100.

The judging unit 102 judges whether the driver has fixated on the screen of the information presentation apparatus 100 based on the time period or frequency the information concerning driver eye gaze is detected by detecting unit 101 at step S202 (step S203). For example, if information concerning driver eye gaze is detected more than a given number of times by the detecting unit 101, or if the information concerning driver eye gaze is detected more than a predetermined number of times within a predetermined time period, the judging unit 102 judges that the driver has fixated on the screen.

The determining unit 104 determines information concerning a specific item to be provided to the driver, from information concerning predetermined items when the judging unit 102 judges that the driver has fixated on the screen (step S204). In this case, determining unit 104 determines the information concerning a specific item to be provided to the driver, based on the current position of the mobile object at the time of the detection of information concerning driver eye gaze by the detecting unit 101, or based on the information computed by the computing unit 103. The information concerning predetermined items includes, for example, information concerning the distance from the current position to a destination or a required time; information concerning the distance from the current position to a junction; or features of roads, terrain, buildings around the current position.

The obtaining unit 105 obtains the information determined by the determining unit 104 at step S204 as the information to be provided to the driver (step S205). In this case, the obtaining unit 105 may obtain all the information concerning the predetermined items. The generating unit 106 generates guidance information that, by sound, informs the driver of the information obtained by the obtaining unit 105 at step S205 (step S206).

The output unit 107 outputs the guidance information generated by the generating unit 106 at step S206 (step S207). The output unit 107 is, for example, a speaker mounted on the mobile object.

As explained above, according to the embodiment, the information presentation apparatus 100 judges whether the driver has fixated on the screen of the information presentation apparatus 100 when the information concerning driver eye gaze is detected. When it is judged that the driver has fixated on the screen, the information presentation apparatus 100 determines, from information concerning predetermined items, information concerning specific items which are to be provided to the drivers and obtains the information. The information presentation apparatus 100 generates guidance information that guides the driver by sound, and the guidance information generated is output. As a result, the driver does not have to fixate on the screen of the information presentation apparatus 100 for an extended period of time while driving and recognizes the information on the screen with the aide of the audio guidance information.

EXAMPLE 1

Hereinafter, example 1 of the present invention is explained. According to example 1, a navigation apparatus mounted on, for example, a vehicle (including a four-wheel vehicle, a two-wheel vehicle) computes, for pieces of predetermined traffic information, respectively, the time that elapses from the previous guidance until judgment that a driver has fixated on a display. The navigation apparatus determines traffic information to be provided to the driver, based on the elapsed time.

(Hardware Configuration of Navigation Apparatus)

Figure 3:
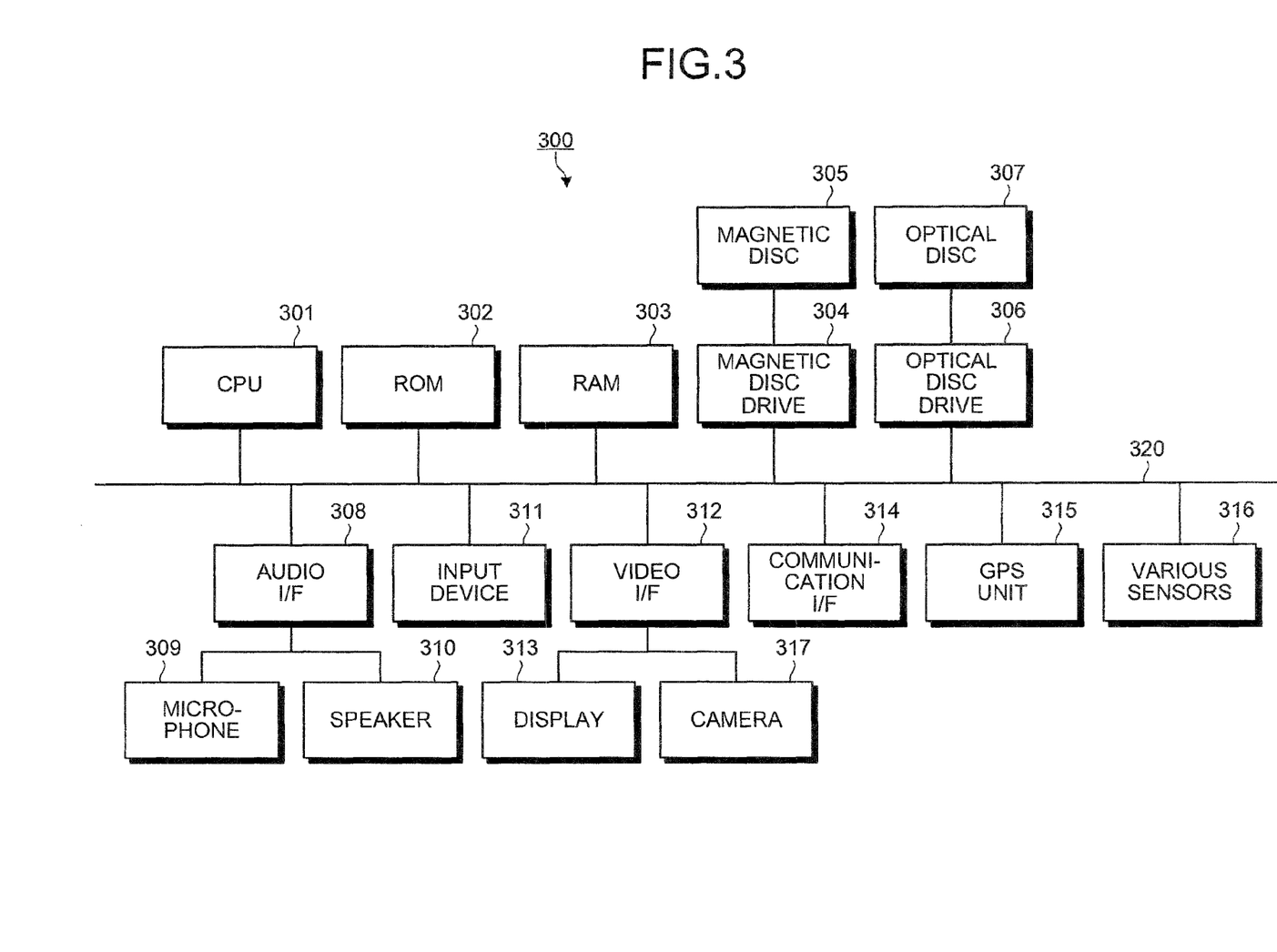
FIG. 3 is a block diagram of one example of the hardware configuration of the navigation apparatus according to example 1.

With reference to FIG. 3, a hardware configuration of a navigation apparatus according to example 1 is explained. FIG. 3 is a block diagram of one example of the hardware configuration of the navigation apparatus according to example 1.

As depicted in FIG. 3, a navigation 300 is mounted on a mobile object such as a vehicle, and includes a CPU 301, a ROM 302, a RAM 303, a magnetic disc drive 304, a magnetic disc 305, an optical disc drive 306, an optical disc 307, an audio I/F (interface) 308, a microphone 309, a speaker 310, an input device 311, a video I/F 312, a display 313, a communication I/F 314, a GPS unit 315, various sensors 316, and a camera 317. The components 301-317 are connected by a bus 320, respectively.

The CPU 301 governs overall control of the navigation apparatus 300. The ROM 302 stores therein various programs such as a boot program, a current position computation program, a route searching program, a route guidance program, an audio generating program, a map information display program, a communication program, a database generating program, a data analysis program. Further, the PAM 303 is used as a work area of the CPU 301.

The current position computation program computes a current position of the vehicle (the current position of the navigation apparatus 300), for example, based on information output from the GPS unit 315 and the various sensors 316 described hereinafter.

The route searching program searches for an optimal route from a starting point to a destination using map information stored on the magnetic disc 305 described hereinafter. Here, the optimal route is, for example, a route that is most compliant with a user-specified condition or a route that is the shortest (fastest) route to the destination. A route leading to not only the destination but to a stop-off point or a rest point may be searched for. A route that is retrieved is output to the audio I/F 308 or the video I/F 312 through the CPU 301.

The route guidance program generates real-time route guidance information based on the route information obtained by the execution of the route searching program, the current position information of the vehicle obtained by the execution of the current position computation program, and the map information read out from the magnetic disc 305. The route guidance information is output to the audio I/F 308 or the video I/F 312 through the CPU 301.

The audio generating program generates information concerning tones and sounds corresponding to patterns. In other words, based on route guidance information generated by the execution of the route guidance program, the audio generating program sets a virtual audio source and generates audio guidance corresponding to a guide point. The audio guidance information is output to the audio I/F 308 through the CPU 301.

The map information display program displays map information stored on the magnetic disc 305 or the optical disc 307 on the display 313 by the video I/F 312.

The CPU 301 judges whether the driver has fixated on the display 313 if the various sensors 316 and the camera 317 detect information concerning driver eye gaze. For example, if the various sensors 316 detect for a period of 0.5 seconds the information concerning driver eye gaze toward the camera 317, the CPU 301 judges that the driver has fixated on the display 313. Alternatively, if the various sensors 316 detect the information concerning driver eye toward the camera 317 more than three times in five seconds, the CPU 301 judges that the driver has fixated on the display 313.

If it is judged that the driver has fixated on the display 313, the CPU 301 computes, for each piece of predetermined traffic information, the time that elapses from the previous guidance until detection of the driver's gaze toward the display 313, and determines traffic information that is to be provided to the driver. The pieces of predetermined traffic information include, for example, pieces of information concerning a traveling time of the vehicle, the distance to a destination, or information concerning left/right turn points. The CPU 301 obtains the selected traffic information and generates guidance information that provides the traffic information guiding the driver by sound. The CPU 301 outputs the guidance information to the speaker 310 through the audio I/F 308.

The magnetic disc drive 304 controls the reading/writing of data from/to the magnetic disc 305 under the control of the CPU 301. The magnetic disc 305 stores data written under the control of the magnetic disc drive 304. The magnetic disc 305 is, for example, a HD (hard disc drive) or a FD (flexible disc).

The optical disc drive 306 controls the reading/writing of data from/to the optical disc 307 under the control of the CPU 301. The optical disc 307 is a removable recording medium from which data is read out under the control of the optical disc drive 306. The optical disc 307 may be a writable recording medium. The removable recording medium may be a MO, a memory card, etc. in addition to the optical disc 307.

One example of the information stored on a recording medium such as the magnetic disc 305 or the optical disc 307 is map information used for route searching or route guidance. The map information includes background data depicting features of buildings, rivers, land surfaces and road shape data indicating the shape of roads. The map information is two-dimensionally or three-dimensionally drawn on the screen of the display 313.

The road shape data further includes traffic condition data. The traffic condition data includes information for nodes indicating whether there is a traffic light, a crosswalk, a ramp of an expressway, a junction, the length (distance) of a link, the width of a road, the direction of traffic, road type (expressway, toll road, general road).

The traffic condition data includes congestion history information that is past congestion information statistically processed based on season, day of the week, long holiday seasons, the time of day, etc. The navigation apparatus 300 obtains the information concerning current congestion from the traffic information received by the communication I/F 314 and can predict the state of traffic at a designated time based on the congestion history information.

According to example 1, the map information is stored on the magnetic disc 305 or the optical disc 307; however, the configuration is not limited hereto. For example, the map information need not be stored integrally with the hardware of the navigation apparatus 300 but may exist outside of the navigation apparatus 300. In such a case, the navigation apparatus 30 obtains the map information, for example, via a network through the communication I/F 314. The map information may be stored in the RAM 303 and so on.

The audio I/F 308 is connected to the microphone 309 for audio input and the speaker 310 for audio output. Audio received by the microphone 309 is A/D-converted within the audio I/F 308. The speaker 310 outputs audio. Audio input through the microphone 309 can be stored as audio data on the magnetic disc 305 or the optical disc 307.

The input device 311 may be a remote controller, a key board, a mouse, a touch panel and so on that includes keys for entering characters, numeric values, and various instructions.

The video I/F 312 is connected to the display 313 and the camera 317. The video I/F 312 includes, for example, a graphic controller that generally controls the display 413, a buffer memory such as VRAM (Video RAM) that temporarily stores immediately displayable image information, and a control IC that controls the display 313 based on image data output from the graphic controller.

The display 313 displays icons, cursors, menus, windows, or various data such as text or images. For example, a CRT, a TFT liquid crystal display, a plasma display, and so on can be employed as the display 313. The display 313 may be provided in plural. For example, one display is mounted for a driver and one display is mounted for backseat passengers.

The communication I/F 314 is wirelessly connected to a network, and functions as an interface between the navigation apparatus 300 and the CPU 301. The communication I/F 314 is also wirelessly connected to a system of networks such as the Internet and functions as an interface between the system of networks and the CPU 301.

The system of networks may be a LAN, a WAN, a public line network, a mobile telephone network and so on. Specifically, the communication I/F 314 includes, for example, an FM tuner, a VICS (Vehicle Information and Communication System)/beacon receiver, a radio navigation apparatus, and other navigation devices, and acquires the road traffic information concerning congestion and traffic regulations that are distributed from VICS centers. VICS is a registered trademark.

The GPS unit 315 receives signals from GPS satellites and outputs information indicating the current position of the vehicle. The information output by the GPS unit 315 is used along with output values of the various sensors 316 in order for the CPU 301 to identify the current position of the vehicle. The information indicating the current position is information such as latitude, longitude, and altitude that specifies one point on a map.

The various sensors 316 output information that can be used to determine the location and behavior of the vehicle, such as a vehicle speed sensor, an acceleration sensor, and an angular speed sensor. Values output by the various sensors 316 are used by the CPU 301 for computation of the current position of the vehicle or measurement of variations in speed or direction.

The various sensors 316 detect the information concerning the gaze of the driver. Specifically, the various sensors 316 detect information concerning driver gaze of the when the eyes of the driver are directed toward the camera 317 disposed near the display 313. More specifically, the various sensors 316 detect a relative position of a central portion of a pupil and an image reflected on a cornea (Purkinje image) based on an image that the camera 316 captures with an infrared function of radiating an infrared ray from a point light source toward an eyeball of the driver. The various sensors 316 detect information concerning the direction of the driver's eyes based on the relative position of a central portion of a pupil and an image reflected on a cornea (Purkinje image).

The camera 317 is disposed near the display 313 and captures the information concerning the direction of the driver's eyes. Specifically, the camera 317 uses the infrared function, radiates an infrared ray from a light source toward the eyeballs of the driver, and captures an image of an area encompassing the eyeballs of the driver. The captured images are stored, for example, in the PAM 303.

In the functional configuration of the information presentation apparatus 100, the detecting unit 101 can be implemented by the various sensors 316 and the camera 317. The judging unit 102, the computing unit 103, and the determining unit 104 are implemented by the CPU 301. The obtaining unit 105 is implemented by the CPU 301, the GPS unit 315, and the various sensors 316. The generating unit 106 is implemented by the CPU 301 and the audio I/F 308. The output unit 107 is implemented by the speaker 310

(Contents of a Process of the Navigation Apparatus 300)

Figure 4:
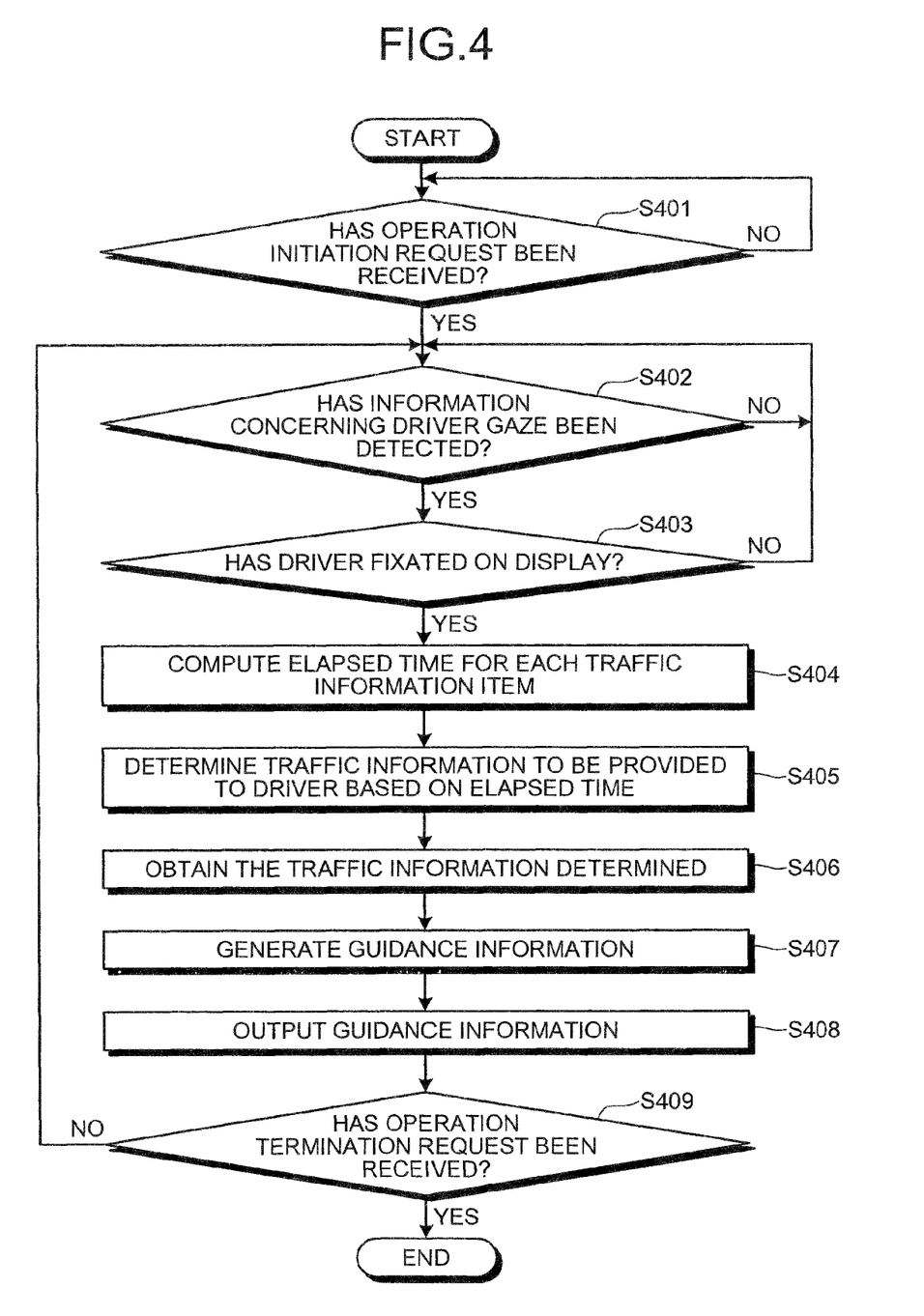
FIG. 4 is a flowchart of a process of the navigation apparatus according to example 1.

With reference to FIG. 4, contents of a process performed by the navigation apparatus 300 according to example 1 are explained. FIG. 4 is a flowchart of a process of the navigation apparatus according to example 1. According to the flowchart of FIG. 4, the navigation apparatus 300 determines whether an operation initiation request has been received (step S401). An operation initiation request is, for example, given by an operation of the input device 311 and an input of instructions by the driver.

At step S401, receipt of the operation initiation request is waited for (step S401: NO). When the operation initiation request is received (step S401: YES), the CPU 301 determines whether the information concerning driver gaze is detected (step S402). For example, the CPU 301 detects the information concerning driver gaze with the various sensors 316 when the driver gazes toward the camera 317 disposed near the display 313.

At step S402, the detection of the information concerning driver gaze is waited for (step S402: NO). When the information is detected (step S402: YES), the CPU 301 judges whether the driver has fixated on the display 313 (step S403). For example, the CPU 301 judges that the driver has fixated on the display 313 when the various sensors 316 detect for more than 0.5 seconds the information concerning driver's gaze directed toward the camera 317. Or, the CPU 301 judges that the driver has fixated on the display 313 when the various sensors 316 detect more than three times in five seconds the information concerning the driver's gaze directed toward the camera 317.

When it is judged that the driver has not fixated on the display 313 at step S403 (step S403: NO), the CPU 301 repeats processing, returning to step S402. When it is judged that the driver has fixated on the display 313 (step S403: YES), the CPU 301 computes, for each piece of predetermined traffic information, an elapsed time measured from the previous guidance until it is judged that the driver has fixated on the display 313 (step S404). The predetermined traffic information includes, for example, pieces of information concerning the traveling time of a vehicle, the distance to a destination, the distance to a left/right turn point, etc.

The CPU 301 determines traffic information that is to be given to the driver based on the elapsed time computed at step S404 (step S405). Specifically, for each piece of traffic information, a reference unit concerning the elapsed time is set, and only those pieces of traffic information for which the elapsed time computed at step S404 is more than or equal to the reference unit is given to the driver. Further, the CPU 301 obtains the traffic information selected at step S405 (step S406).

The CPU 301 generates guidance information that informs, by sound, the driver of the traffic information obtained at step S406 (step S407). The CPU 301 outputs the guidance information generated at step S407 from the speaker 310 through the audio I/F 308 (step S408).

The CPU 301 determines whether an operation termination request has been received (step S409). The operation termination request may be implemented, for example, by the input of an instruction through the input device 311 by the driver. If the operation termination request for terminating operation is not received at step S409 (step S409: NO), the CPU 301 repeats processing, returning to step S402. If the operation termination request is received at step S409 (step S409: YES), the CPU 301 terminates the processing.

Figure 5:
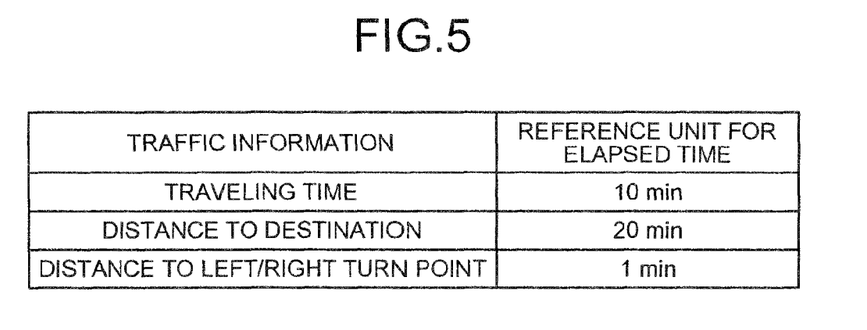
FIG. 5 is a diagram depicting reference units that are set for each piece of predetermined traffic information and serve as a reference for the elapsed time.
Figure 6:
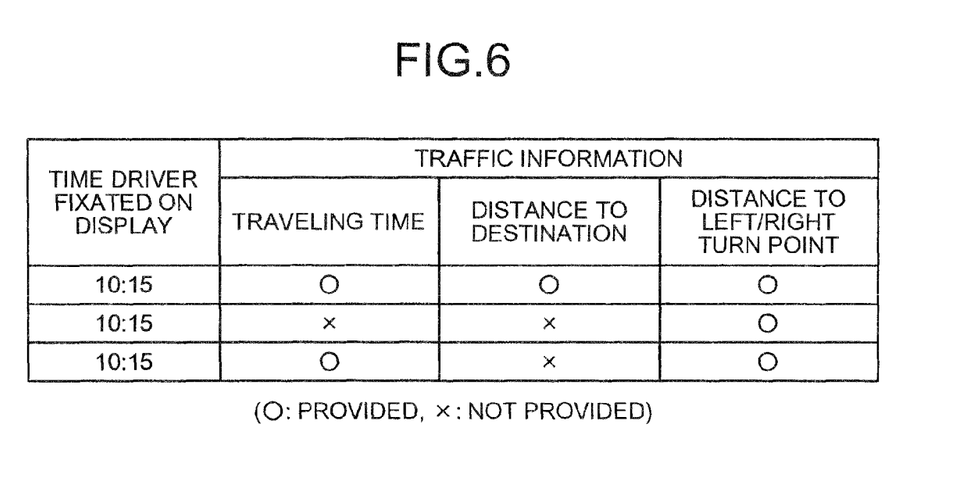
FIG. 6 is a diagram of one example of determination by the navigation apparatus, where specific traffic information to be provided to the driver is determined from among pieces of predetermined traffic information and based on the elapsed time.

With reference to FIGS. 5 and 6, one example is explained where the navigation apparatus 300 according to example 1 determines, from among pieces of predetermined traffic information, traffic information that is to be given to the driver based on the elapsed time.

FIG. 5 is a diagram depicting reference units that are set for each piece of predetermined traffic information and serve as a reference for the elapsed time. As depicted in FIG. 5, the predetermined traffic information includes, for example, pieces of information concerning the traveling time of a vehicle, the distance to a destination, the distance to a left/right turn point, etc. Each piece of traffic information has a reference unit for the elapsed time. Reference units can be changed by the driver.

For example, with respect to the elapsed time, the reference unit for the traveling time is set to be ten minutes, the reference unit for the distance to a destination is set to be twenty minutes, and the reference unit for the distance to a left/right turn point is one minute. The navigation apparatus 300 computes, for each piece of predetermined traffic information, the time that elapses from the previous guidance until detection of the driver's gaze at the display 313, and informs the driver only of the pieces of traffic information whose corresponding elapsed time is more than or equal to a reference unit.

FIG. 6 is a diagram of one example of determination by the navigation apparatus, where specific traffic information to be provided to the driver is determined from among pieces of predetermined traffic information and based on the elapsed time. As depicted in FIG. 6, here, the navigation apparatus 300 has provided information at 10:15 concerning a traveling time, the distance to a destination, and the distance to a left/right turn point.

If the driver fixates on the display 313 at 10:23, the elapsed time since the previous guidance of information concerning the traveling time, which was provided at 10:15, is eight minutes. Similarly, the elapsed time since guidance for the distance to a destination and for the left/right turn point was given is also eight minutes. In this case, the navigation apparatus 300 provides only the information concerning a left/right turn point because the elapsed time is more than or equal to the reference unit of the information concerning a left/right turn point as depicted in FIG. 5.

If the driver fixates on the display 313 again at 10:30, the elapsed time since the previous guidance for the information concerning the traveling time, which was at 10:15, is 15 minutes. Similarly, the elapsed time since the previous guidance was given for the distance to a destination is 15 minutes, and the elapsed time since the previous guidance was given for the distance to a left/right turn point is seven minutes. In this case, the navigation apparatus 300 provides information concerning the traveling time and the distance to a left/right turn point because the elapsed time is more than or equal to the reference units of the traveling time and the distance of a left/right turn point as depicted in FIG. 5.

As set forth above, according to example 1, the navigation apparatus 300, if the information concerning driver eye gaze is detected, judges whether the driver has fixated on the display 313 of the navigation apparatus 300. If it is judged that the driver has fixated on the display 313, the navigation apparatus 300 computes, for each piece of predetermined traffic information, the elapsed time measured from the previous guidance until judgment that the driver has fixated on the display 313. The navigation apparatus 300 determines traffic information that is to be given to the driver based on the elapsed time and obtains the traffic information. The navigation apparatus 300 generates guidance information that informs the driver of the traffic information by sound and outputs the information from the speaker 310. As a result, when the driver fixates on the display 313 while driving, information having contents identical to that previously given is not output.

As depicted in FIG. 5, here, a reference unit for elapsed time is set beforehand; however, a reference unit may be changed based on the current position of the vehicle. For example, a reference unit for elapsed time concerning the distance to a left/right turn point may be as follows: a reference unit is five minutes when the vehicle is more than 1 km from the left/right turn point; a reference unit is one minute when the vehicle is in an area less 1 km but more than 300 m from the left/right turn point; a reference unit is 10 seconds when the vehicle is within 300 m from the left/right turn point.

According to example 1, the navigation 300 computes, for each piece of traffic information, an elapsed time from the previous guidance until judgment that the driver has fixated on the display 313. However, an elapsed time may be measured from the previous time that it is judged that the driver has fixated on the display 313 or from the output of the guidance information from the speaker 310 at the previous time until it is judged that the driver fixates on at the display 313 again.

EXAMPLE 2

Hereinafter, example 2 according to the present invention is explained. According to example 2, the navigation apparatus 300 mounted on a mobile object such as a vehicle (including a four-wheel vehicle, a two-wheel vehicle) computes, for each piece of predetermined traffic information, the number of times the driver fixates on the display 313 after the previous guidance information has been given. The navigation apparatus 300 determines the traffic information is to be given to the driver based on the computed number of times of fixation. Since a hardware configuration of the navigation apparatus 300 is substantially identical to the configuration depicted in FIG. 3, detailed explanation thereof is omitted.

(Contents of a Process of the Navigation Apparatus 300)

Figure 7:
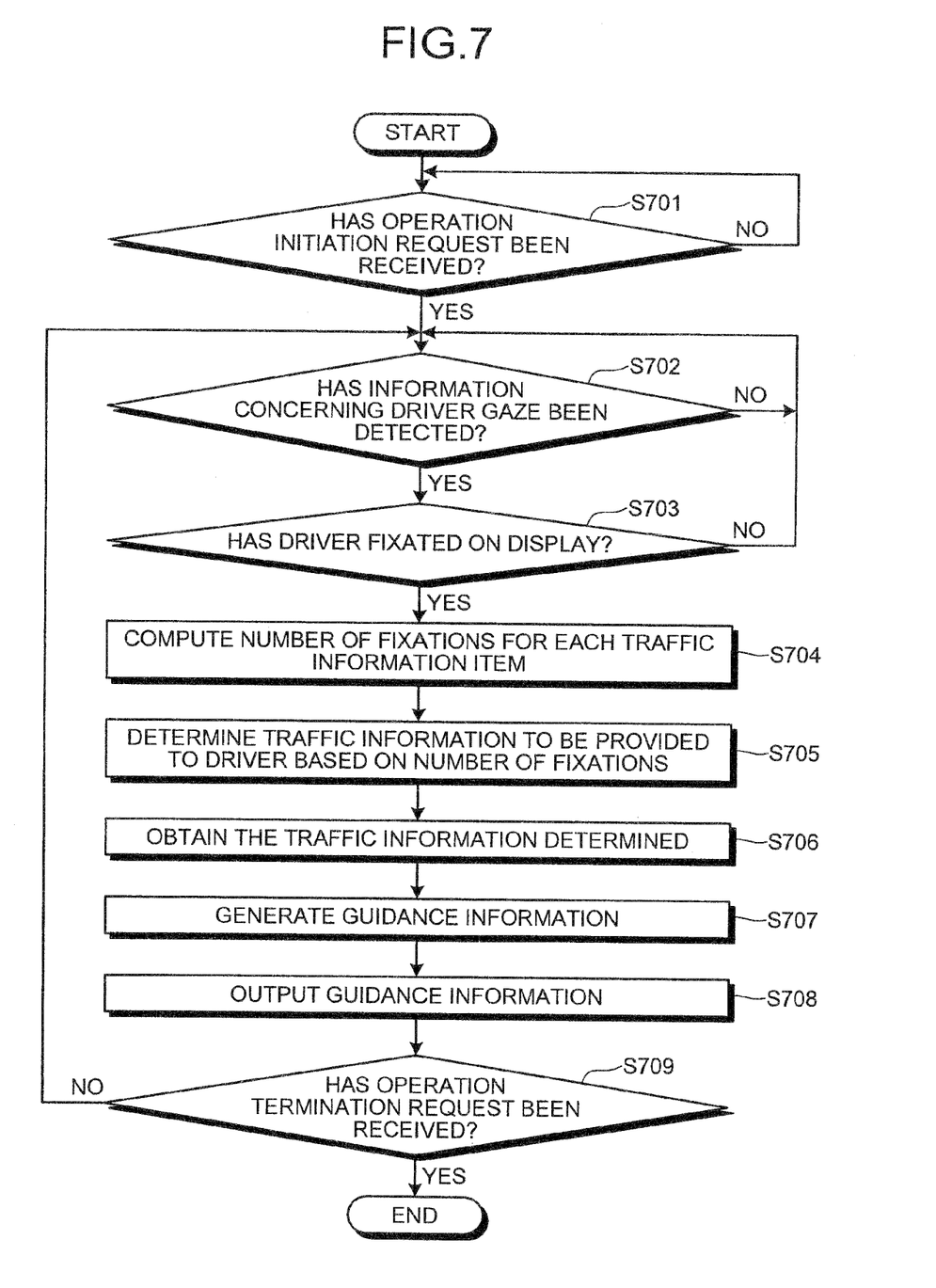
FIG. 7 is a flowchart of a process of the navigation apparatus according to example 2.

With reference to FIG. 7, contents of a process performed by the navigation apparatus 300 according to example 2 are explained. FIG. 7 is a flowchart of a process of the navigation apparatus according to example 2. According to the flowchart of FIG. 7, the navigation apparatus 300 determines whether an operation initiation request has been received (step S701).

An operation initiation request is, for example, given by an operation of the input device 311 and an input of instructions by the driver.

At step S701, receipt of the operation initiation request is waited for (step S701: NO). When the operation initiation request is received (step S701: YES), the CPU 301 determines whether the information concerning driver gaze is detected (step S702). For example, the CPU 301 detects the information concerning driver gaze with the various sensors 316 when the driver gazes toward the camera 317 disposed near the display 313.

At step S702, the detection of the information concerning driver gaze is waited for (step S702: NO). When the information is detected (step S702: YES), the CPU 301 judges whether the driver has fixated on the display 313 (step S703). For example, the CPU 301 judges that the driver has fixated on the display 313 when the various sensors 316 detect for more than 0.5 seconds the information concerning driver's gaze directed toward the camera 317. Or, the CPU 301 judges that the driver has fixated on the display 313 when the various sensors 316 detect more than three times in five seconds the information concerning the driver's gaze directed toward the camera 317.

When it is judged that the driver has not fixated on the display 313 at step S703 (step S703: NO), the CPU 301 repeats processing, returning to step S702. When it is judged that the driver has fixated on the display 313 (step S703: YES), the CPU 301 computes, for each piece of predetermined traffic information, the number of times the driver has fixated on the display 313 since the previous guidance (step S704). The predetermined traffic information includes, for example, pieces of information concerning the traveling time of a vehicle, the distance to a destination, the distance to a left/right turn point, etc.

The CPU 301 determines traffic information that is to be given to the driver based on the number of times the driver fixates on the display computed at step S704 (step S705). Specifically, for each piece of traffic information, a reference unit concerning the number of times the driver fixates on the display is set, and only those pieces of traffic information for which the number of times the driver fixates on the display computed at step S704 is more than or equal to the reference unit is given to the driver. Further, the CPU 301 obtains the traffic information determined at step S705 (step S706).

The CPU 301 generates guidance information that informs, by sound, the driver of the traffic information obtained at step S706 (step S707). The CPU 301 outputs the guidance information generated at step S707 from the speaker 310 through the audio I/F 308 (step S708).

The CPU 301 determines whether an operation termination request has been received (step S709). The operation termination request may be implemented, for example, by the input of an instruction through the input device 311 by the driver. If the operation termination request for terminating operation is not received at step S709 (step S709: NO), the CPU 301 repeats processing, returning to step S702. If the operation termination request is received at step S709 (step S709: YES), the CPU 301 terminates the processing.

Figure 8:
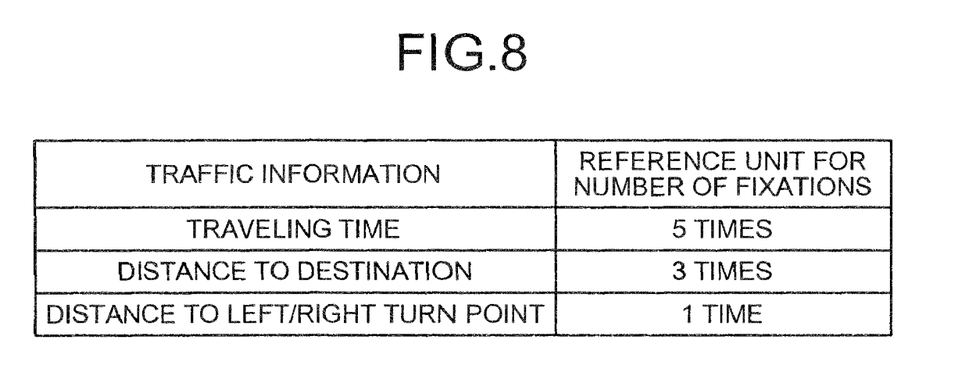
FIG. 8 is a diagram depicting reference units that are set for each piece of predetermined traffic information and serve as a reference for the number of times the driver fixates on the display.

With reference to FIG. 8, one example is explained where the navigation apparatus 300 according to example 2 determines, from among pieces of predetermined traffic information, traffic information that is to be given to the driver based on the number of times the driver fixates on the display.

FIG. 8 is a diagram depicting reference units that are set for each piece of predetermined traffic information and serve as a reference for the number of times the driver fixates on the display. As depicted in FIG. 8, the traffic information that the navigation apparatus 300 obtains is, for example, information concerning the traveling time of a vehicle, the distance to a destination, the distance to a left/right turn point and so on. Each piece of traffic information has a reference unit for the number of times the driver fixates on the display. Reference units can be changed by the driver.

For example, with respect to the number of fixations, the reference unit for the traveling time is set to be five times, the reference unit for the distance to a destination is set to be three times, and the reference unit for the distance to a left/right turn point is one time. The navigation apparatus 300 computes, for each piece of traffic information, the number of times the driver fixates on the display after the previous provision of traffic information to the driver, and provides the driver of only such traffic information whose number of fixations is more than or equal to a reference unit.

Here, the number of fixations is three after the previous provision of information concerning the traveling time to the driver, the number of fixations is four after the previous provision of information concerning the distance to a destination, and the number of fixations is five after the previous provision of information concerning the distance to a left/right turn point. In this case, the navigation apparatus 300 provides the driver with the information concerning the distance to a destination and the distance to a left/right turn point whose corresponding numbers of fixations are more than or equal to the reference units as depicted in FIG. 8.

As set forth above, according to example 2, the navigation apparatus 300, if the information concerning driver eye gaze is detected, judges whether the driver has fixated on the display 313 of the navigation apparatus 300. If it is determined that the driver has fixated on the display 313, the navigation apparatus 300 computes, for each piece of predetermined traffic information, the number of times the driver has fixated on the display 313 since the previous guidance. The navigation apparatus 300 determines traffic information that is to be given to the driver based on the number of fixations and obtains the traffic information. The navigation apparatus 300 generates guidance information that informs the driver of the traffic information by sound and outputs the information from the speaker 310. As a result, when the driver fixates on the display 313 while driving, information having contents identical to that previously given is not output.

As depicted in FIG. 8, the reference unit for the number of fixations is given beforehand; however, the reference unit may be changed based on the current position of a vehicle. For example, regarding the number of fixations for a left/right turn point, the number of fixations is set to five when the vehicle is more than or equal to 1 km away from the left/right turn point, the number of fixations is three when the vehicle is more than or equal to 300 m but less than 1 km away from the left/right turn point, and the number of fixations is one when the vehicle is within 300 m from the left/right turn point.

According to example 2, the navigation apparatus 300 computes, for each piece of predetermined traffic information, the number of times the driver fixates on the display 313 since the previous guidance. However, the navigation apparatus may compute the number of times the driver has fixated on the display 313 since the output of the guidance information from the speaker 310, or the number of times the driver fixates on the display 313 within a predetermined time interval.

Hereinafter, example 3 according to the present invention is explained. According to example 3, the navigation apparatus 300 mounted on a mobile object such as a vehicle (including a four-wheel vehicle, a two-wheel vehicle) computes, for each piece of traffic information, the time and the distance traveled by the vehicle since the previous provision of the traffic information. The navigation apparatus 300 determines the traffic information to be given to the driver based on the traveling time and the traveling distance of the vehicle. Since a hardware configuration of the navigation apparatus 300 is substantially identical to the configuration depicted in FIG. 3, detailed explanation thereof is omitted.

(Contents of a Process of the Navigation Apparatus 300)

Figure 9:
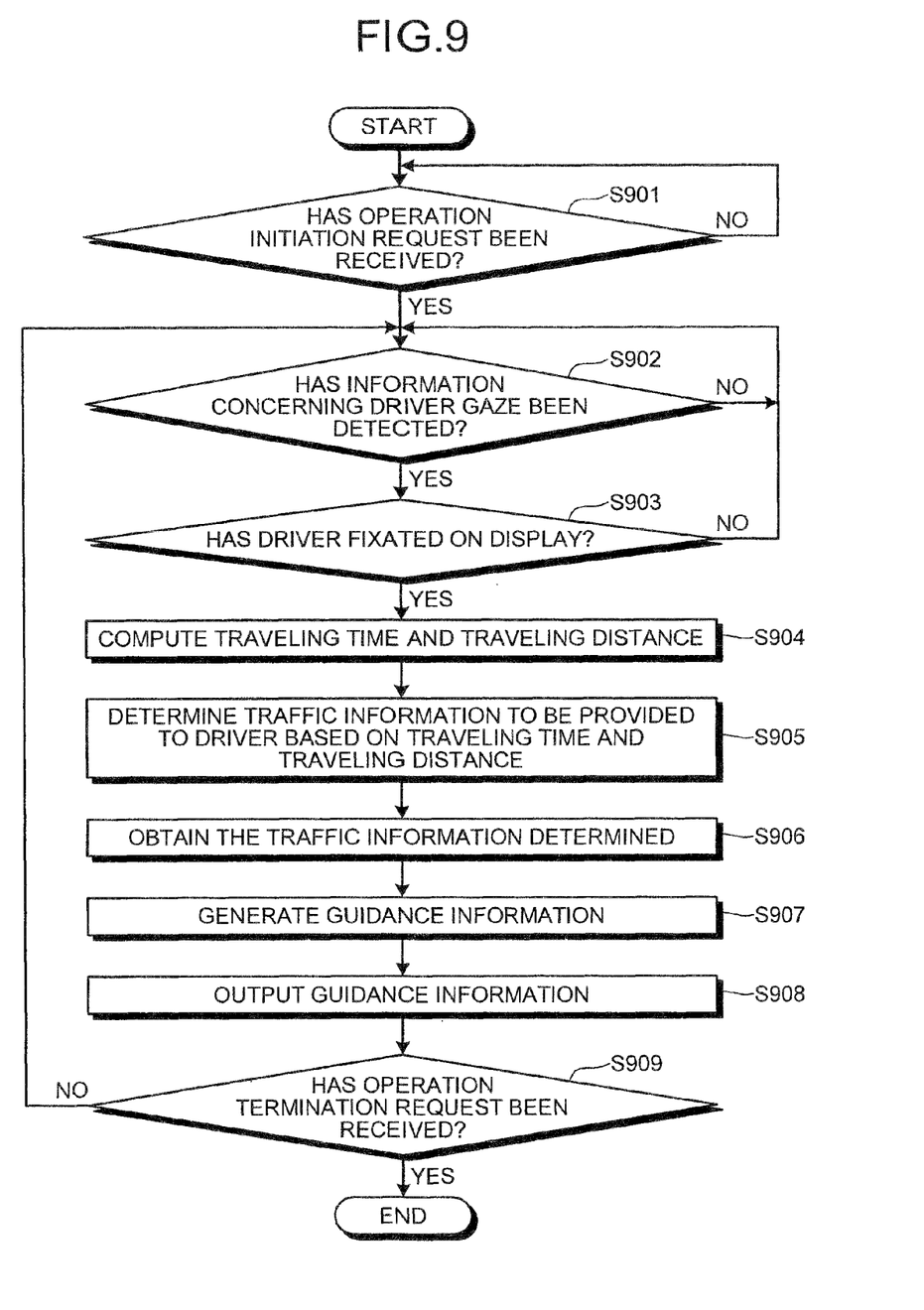
FIG. 9 is a flowchart of a process of the navigation apparatus according to example 3.

With reference to FIG. 9, contents of a process performed by the navigation apparatus 300 according to example 3 are explained. FIG. 9 is a flowchart of a process of the navigation apparatus according to example 3. According to the flowchart of FIG. 9, the navigation apparatus 300 determines whether an operation initiation request has been received (step S901). An operation initiation request is, for example, given by an operation of the input device 311 and an input of instructions by the driver.

At step S901, receipt of the operation initiation request is waited for (step S901: NO). When the operation initiation request is received (step S901: YES), the CPU 301 determines whether the information concerning driver gaze is detected (step S902). For example, the CPU 301 detects the information concerning driver gaze with the various sensors 316 when the driver gazes toward the camera 317 disposed near the display 313.

At step S902, the detection of the information concerning driver gaze is waited for (step S902: NO). When the information is detected (step S902: YES), the CPU 301 judges whether the driver has fixated on the display 313 (step S903). For example, the CPU 301 judges that the driver has fixated on the display 313 when the various sensors 316 detect for more than 0.5 seconds the information concerning driver's gaze directed toward the camera 317. Or, the CPU 301 judges that the driver has fixated on the display 313 when the various sensors 316 detect more than three times in five seconds the information concerning the driver's gaze directed toward the camera 317.

When it is judged that the driver has not fixated on the display 313 at step S903 (step S903: NO), the CPU 301 repeats processing, returning to step S902. When it is judged that the driver has fixated on the display 313 (step S903: YES), the CPU 301 computes, for each piece of predetermined traffic information, the traveling time and the traveling distance of the vehicle since the previous guidance (step S904). The pieces predetermined traffic information include, for example, pieces of information concerning the traveling time of a vehicle, the distance to a destination, the distance to a left/right turn point and so on.

The CPU 301 determines traffic information that is to be given to the driver based on the traveling time and traveling distance of the vehicle computed at step S904 (step S905). Specifically, for each piece of traffic information, a reference unit concerning the traveling time or the traveling distance is set, and only those pieces of traffic information for which the traveling time or the traveling distance computed at step S904 is more than or equal to the reference unit is given to the driver.

Further, the CPU 301 obtains the traffic information selected at step S905 (step S906). The CPU 301 generates guidance information that informs, by sound, the driver of the traffic information obtained at step S906 (step S907). The CPU 301 outputs the guidance information generated at step S907 from the speaker 310 through the audio I/F 308 (step S908).

The CPU 301 determines whether an operation termination request has been received (step S909). The operation termination request may be implemented, for example, by the input of an instruction through the input device 311 by the driver. If the operation termination request for terminating operation is not received at step S909 (step S909: NO), the CPU 301 repeats processing, returning to step S902. If the operation termination request is received at step S909 (step S909: YES), the CPU 301 terminates the processing.

Figure 10:
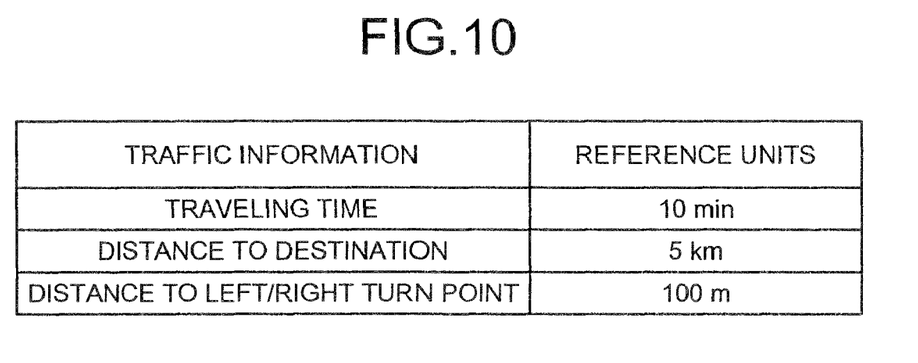
FIG. 10 is a diagram depicting reference units that are set for each piece of predetermined traffic information and serve as a reference for the traveling time and the traveling distance.

With reference to FIG. 10, one example is explained where the navigation apparatus 300 according to example 3 determines, from among pieces of predetermined traffic information, traffic information that is to be given to the driver based on the time and the distance the vehicle traveled since the previous provision of the traffic information.

FIG. 10 is a diagram depicting reference units that are set for each piece of predetermined traffic information and serve as a reference for the traveling time and the traveling distance. As depicted in FIG. 10, the traffic information that the navigation apparatus 300 obtains is, for example, information concerning the traveling time of a vehicle, the distance to a destination, the distance to a left/right turn point and so on. Each piece of traffic information has a reference unit for the traveling time and the traveling distance. Reference units can be changed by the driver.

For example, the reference unit for the traveling time is set to 10 minutes, the reference unit for the distance to a destination is set to 5 km, and the reference unit for the distance to a left/right turn point is set to 100 m. The navigation apparatus 300 computes the traveling time and the traveling distance of the vehicle after the previous provision of the traffic information and provides the driver with of traffic information for which the computed traveling time and traveling distance are more than or equal to the reference units.

For example, here, the traveling time after the previous provision of traveling time information to the driver is five minutes, the traveling distance after the previous provision of information concerning the distance to a destination is 6 km, and the traveling distance after the previous provision of information concerning the distance to a left/right turn point is 300 m. In this case, the navigation apparatus 300 provides the driver with information concerning the distance to a destination and the distance to a left/right turn point for which the traveling time and the traveling distance are more than or equal to the reference units as depicted in FIG. 10.

As set forth above, according to example 3, the navigation apparatus 300, if the information concerning driver eye gaze is detected, judges whether the driver has fixated on the display 313 of the navigation apparatus 300. If it is determined that the driver has fixated on the display 313, the navigation apparatus 300 computes, for each piece of predetermined traffic information, the time and the distance the vehicle traveled after the previous provision of guidance. The navigation apparatus 300 determines traffic information that is to be given to the driver based on the computed traveling time and the traveling distance of the vehicle and obtains the traffic information. The navigation apparatus 300 generates guidance information that informs the driver of the traffic information by sound and outputs the information from the speaker 310. As a result, when the driver fixates on the display 313 while driving, information having contents identical to that previously given is not output.

As depicted in FIG. 10, the reference unit for the traveling time and the traveling distance is given beforehand; however, the reference unit may be changed based on the current position of a vehicle. For example, regarding the traveling distance for a left/right turn point, the traveling distance is set to 3 km when the vehicle is more than or equal to 1 km away from the left/right turn point, the traveling distance is 200 m when the vehicle is more than or equal to 300 m but less than 1 km away from the left/right turn point, and the traveling distance is set to 100 m when the vehicle is within 300 m from the left/right turn point.

According to example 3, the navigation apparatus 300 computes, for each piece of predetermined traffic information, the time and the distance traveled by the vehicle since the previous guidance. However, the navigation apparatus 300 may compute the traveling time and the traveling distance of the mobile object after it is determined that the driver has fixated on the display 313 or after guidance information is output from the speaker 310.

According to examples 1 to 3, the navigation apparatus 300 obtains information concerning a specific traffic item from among pieces of predetermined traffic information and provides audio guidance for the obtained traffic information if it is determined that the driver has fixated on the display 313. However, guidance is not limited to guidance for the traffic information. The map information displayed on the screen may be used. For example, if a map near a junction is displayed on the screen at the detection of the driver's gaze at the display 313, the navigation apparatus 300 informs, by sound, the driver of the name of a landmark near the junction, the location of the landmark, the direction from the current position, the name of the junction, or the name of the cross street.

The information presentation method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The invention claimed is:

1. An information presentation apparatus comprising:
    a detecting unit that detects gaze information concerning driver gaze directed toward a screen that displays assistance information, the assistance information assisting travel of a mobile object, said detecting unit comprising a first hardware element;
    a judging unit that judges whether the driver fixates on the screen, the judging unit being implemented by a computer processing unit;
    a determining unit connected to the detecting unit,
    when the judging unit judges a present fixation by the driver on the screen,
    the determining unit, based on an elapsed time interval between the present fixation by the driver on the screen and a prior fixation by the driver on the screen, determines whether information concerning specific items of the assistance information is to be provided to the driver from information concerning predetermined items of assistance information;
    an obtaining unit that, when the gaze information is detected by the detecting unit, obtains the information of the specific item determined by the determining unit to be given to a driver based on the assistance information, the obtaining unit being implemented by the computer processing unit connected to said first hardware element;
    a generating unit that generates guidance information providing, by sound, the information obtained by the obtaining unit, the generating unit being implemented by the computer processing unit; and
    an output unit that outputs the guidance information generated by the generating unit, the output unit comprising a second hardware element connected to said computer processing unit.

2. The information presentation apparatus according to claim 1, wherein
    the assistance information is map information indicating a current position of the mobile object, and
    the obtaining unit obtains the information given to the driver based on the map information.

3. The information presentation apparatus according to claim 1, wherein the obtaining unit obtains information concerning predetermined items as the information to be given to the driver.

4. The information presentation apparatus according to claim 1, wherein the determining unit determines the information concerning the specific item based on a position of the mobile object when the detecting unit detects the gaze information.

5. The information presentation apparatus according to claim 1,
    the judging unit judges whether the driver fixates on the screen based on the detecting the driver's gaze being fixated on the screen for one of i) a period of time, and ii) a frequency of gazes detected by the detecting unit detects the gaze information,
    wherein the obtaining unit obtains the information to be given to the driver when the judging unit judges that the driver fixates on the screen.

6. The information presentation apparatus according to claim 1, further comprising
    a computing unit that computes elapsed time elapsing from when the judging unit judges that the driver fixates on the screen or from when the output unit outputs the guidance information until the judging unit again judges that the driver fixates on the screen, wherein
    the determining unit determines the information concerning the specific item based on the elapsed time computed by the computing unit.

7. The information presentation apparatus according to claim 1, further comprising
    a computing unit that computes a fixation frequency indicating a number of times the judging unit judges, after the output unit outputs the guidance information, that the driver fixates on the screen, wherein
    the determining unit determines the information concerning the specific item based on the fixation frequency computed by the computing unit.

8. The information presentation apparatus according to claim 1, further comprising
    a computing unit that computes a traveling time and a traveling distance traveled by the mobile object after the judging unit judges that the driver fixates on the screen or after the output unit outputs the guidance information, wherein
    the determining unit determines the information concerning the specific item based on the traveling time and the traveling distance computed by the computing unit.

9. The information presentation apparatus according to claim 1, further comprising
    a computing unit that computes a fixation frequency indicating a number of times the judging unit judges, within a predetermined time period, that the driver fixates on the screen, wherein
    the determining unit determines the information concerning the specific item based on the fixation frequency computed by the computing unit.

10. The information presentation apparatus according to claim 9, wherein the determining unit determines, with respect to each of the predetermined items, the information concerning the specific item based on the fixation frequency computed by the computing unit.

11. The information presentation apparatus according to claim 1, further comprising
a computing unit that computes, for each of the predetermined items, elapsed time elapsing from when the output unit outputs the guidance information until the judging unit judges that the driver fixates on the screen, wherein
the determining unit determines the information concerning the specific item based on the elapsed time computed by the computing unit.

12. The information presentation apparatus according to claim 1, further comprising
a computing unit that computes, for each of the predetermined items, a fixation frequency indicating a number of times the judging unit judges, after the output unit outputs the guidance information, that the driver fixates on the screen, wherein
the determining unit determines the information concerning the specific item based on the fixation frequency computed by the computing unit.

13. The information presentation apparatus according to claim 1, further comprising
a computing unit that computes, for each of the predetermined items, a traveling time and a traveling distance traveled by the mobile object after the judging unit judges that the driver fixates on the screen or after the output unit outputs the guidance information, wherein
the determining unit determines the information concerning the specific item based on the traveling time and the traveling distance computed by the computing unit.

14. The information presentation apparatus of claim 1, wherein,
said first hardware element of said detecting unit comprises a camera and sensors detecting the driver's gaze towards the camera, and
said second hardware element of said output unit comprises a speaker.

15. The information presentation apparatus of claim 1, wherein the judging unit judges whether the driver fixates on the screen based for the period of time concerning the driver's gaze towards the camera.

16. The information presentation apparatus of claim 1, wherein the judging unit that judges whether the driver fixates on the screen based on a frequency that the driver's gaze towards the camera is detected in a fixed time interval.

17. The information presentation apparatus of claim 1, wherein,
a time reference unit represents a minimum reference time for giving the specific item of assistance information to the driver,
the predetermined items of assistance information comprises a first item, a second item, and a third item,
the first item being a traveling time of a vehicle, the first item having a first time reference unit for the elapsed time interval,
the second item being a first distance to a destination, the second unit having a second time reference unit for the elapsed time interval,
the third item being a second distance to a turn point, the third item having a third time reference unit for the elapsed time interval,
the prior fixation by the driver on the screen is determined individually with respect to each of the first, second, and third items, the prior fixation being a last time the respective one of the first, second, and third items were given to the driver,
the determining unit determines the information concerning the specific items of the assistance information to be provided to the driver from information concerning predetermined items of assistance information only for items of assistance information where the elapsed time interval with respect to the last time the respective one of the first, second, and third items were given to the driver is at least equal to the corresponding time reference unit, so that the determining unit determines to provide to the driver:
the first item only when the elapsed time interval is at least equal to the first reference time indicating that,
the second item only when the elapsed time interval is at least equal to the second reference time, and
the third item only when the elapsed time interval is at least equal to the third reference time.

18. The information presentation apparatus of claim 1, wherein,
a time reference unit represents a minimum reference time for giving the specific item of assistance information to the driver,
the items of assistance information comprises a first item, a second item, and a third item,
the first item has a first time reference unit,
the second item has a second time reference unit,
the third item has a third time reference unit,
the prior fixation by the driver on the screen is determined individually with respect to each of the first, second, and third items, the prior fixation being a last time the respective one of the first, second, and third items were given to the driver,
the determining unit determines the information concerning the specific items of the assistance information to be provided to the driver only for items of assistance information satisfying a condition that the elapsed time interval with respect to the last time the respective one of the first, second, and third items were given to the driver is at least equal to the corresponding time reference unit, so that the determining unit determines to provide to the driver:
the first item only when the elapsed time interval is at least equal to the first reference time,
the second item only when the elapsed time interval is at least equal to the second reference time, and
the third item only when the elapsed time interval is at least equal to the third reference time.

19. An information presentation method comprising:
using a hardware element, detecting gaze information concerning driver gaze directed toward a screen that displays assistance information assisting travel of a mobile object;
judging whether the driver fixates on the screen, the judging step being implemented by the computer processing unit;
when the judging step judges a present fixation by the driver on the screen, and based on an elapsed time interval between the present fixation by the driver on the screen and a prior fixation by the driver on the screen, determining whether information concerning specific items of the assistance information is to be provided to the driver from information concerning predetermined items of assistance information;

obtaining, when the gaze information is detected at the detecting step, the information of the specific item determined by the determining step to be given to a driver based on the assistance information, obtaining step using a computer processing unit;

generating guidance information providing, by sound, the information obtained at the obtaining, said generating step using the computer processing unit; and using another hardware element, outputting the guidance information generated at the generating.

20. A non-transitory computer-readable recording medium storing therein an information presentation program that causes a computer to execute the steps of:

detecting gaze information concerning driver gaze directed toward a screen that displays assistance information assisting travel of a mobile object;

judging whether the driver fixates on the screen;

when the judging step judges a present fixation by the driver on the screen, and based on an elapsed time interval between the present fixation by the driver on the screen and a prior fixation by the driver on the screen, determining whether information concerning specific items of the assistance information is to be provided to the driver from information concerning predetermined items of assistance information;

obtaining, when the gaze information is detected at the detecting, the information of the specific item determined by the determining step to be given to a driver based on the assistance information;

generating guidance information providing, by sound, the information obtained at the obtaining step; and outputting the guidance information generated at the generating step.

* * * * *